Figure 1:
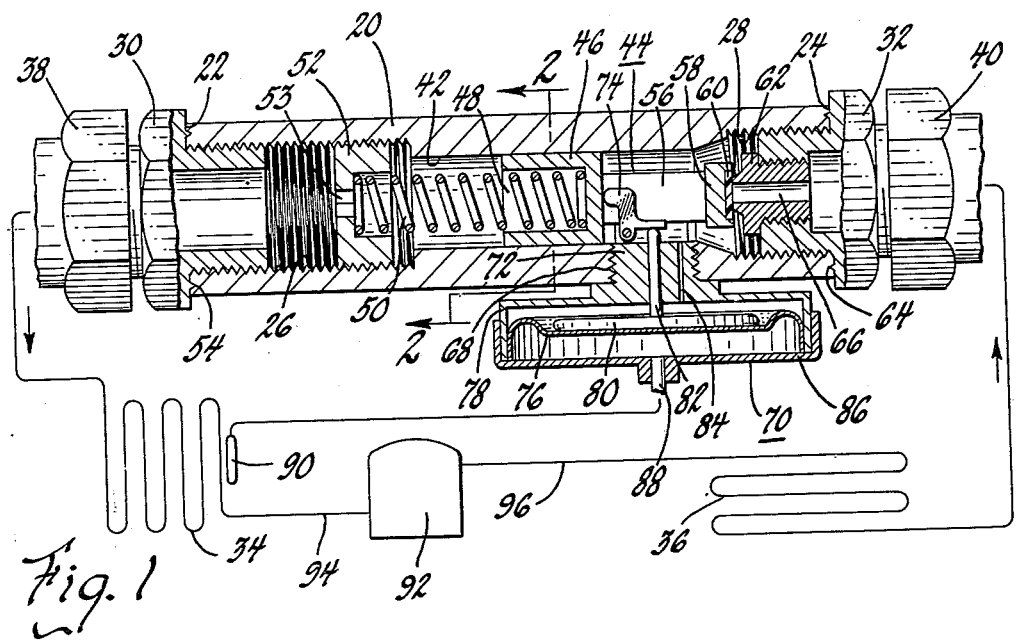

Oct. 16, 1962 W. W. WATT 3,058,716
EXPANSION VALVE
Filed Jan. 8, 1959

INVENTOR.
William W. Watt
BY Edwin S. Dybvig
HIS ATTORNEY

United States Patent Office 3,058,716
Patented Oct. 16, 1962

3,058,716
EXPANSION VALVE
William W. Watt, Dayton, Ohio, assignor to General Motors Corporation, Detroit, Mich., a corporation of Delaware
Filed Jan. 8, 1959, Ser. No. 785,668
2 Claims. (Cl. 251—58)

This invention pertains to refrigerating apparatus and especially to thermostatic expansion valves such as are used to control the expansion of the refrigerant from the condenser to the evaporator.

Many failures of thermostatic expansion valves are caused by the loss of charge in the diaphragm system due to defects in their manufacture or to damage during installation. In those types of expansion valve construction wherein a part of the diaphragm system is permanently fixed to the remainder of the valve, the entire valve must be returned to the factory for the installation of a new diaphragm system when any failure occurs in the diaphragm system.

It is an object of this invention to provide a simple thermostatic expansion valve arrangement wherein the sealed diaphragm system is readily removable from the remainder of the valve for easy replacement if defective or damaged.

It is also desirable that the thermostatic expansion valve be so designed that substantially all parts thereof can be machined upon conventional automatic machinery. It is also desirable that the thermostatic expansion valve be small, compact and easily installed.

It is another object of this invention to provide a thermostatic expansion valve in which the inlet and outlet connections are coaxially aligned and the valve body as well as most of the parts can be readily made upon conventional automatic screw machines.

These and other objects are attained in the forms shown in the drawings in which the body is made of a single member of generally straight tubular shape having a coaxial passage internally threaded at the ends receiving flared nipples and flare nuts for making flare connections with the adjacent ends of the condenser and evaporator tubing. The flared nipple connecting with the condenser tubing is internally threaded to receive a valve seat member.

In one form, a valve member is slidably mounted and located coaxially within the valve body. It has at one end a plastic material adapted to engage the valve seat and at the opposite end a spring retainer for a compression type closing coil spring located coaxially within the valve body and held at the opposite end by a second spring retainer threaded into the valve body. Access to this threaded spring retainer is obtained by removing the threaded nipple or union. A diaphragm assembly is threaded into the side of the valve body and carries a bell crank lever actuated from the diaphragm through a follower and a pin. The bell crank lever engages the valve member to move the valve member toward the open position upon an increase in pressure within the diaphragm chamber. The opposite side of the diaphragm is subjected to the pressure within the valve body through a small passage.

The second form is generally similar in principle but the bell crank member incorporates the valve and is a part of a removable assembly which includes a sleeve which provides a pivot for the bell crank and which supports the threaded adjustable spring retainer supporting one end of the closing spring having its opposite end bearing against the bell crank to move it against the valve seat. A diaphragm assembly is threaded into the side of this valve body and carries a follower engaging the bell crank lever to move it to the open position.

Further objects and advantages of the present invention will be apparent from the following description, reference being had to the accompanying drawings wherein preferred embodiments of the present invention are clearly shown.

Figure 3:
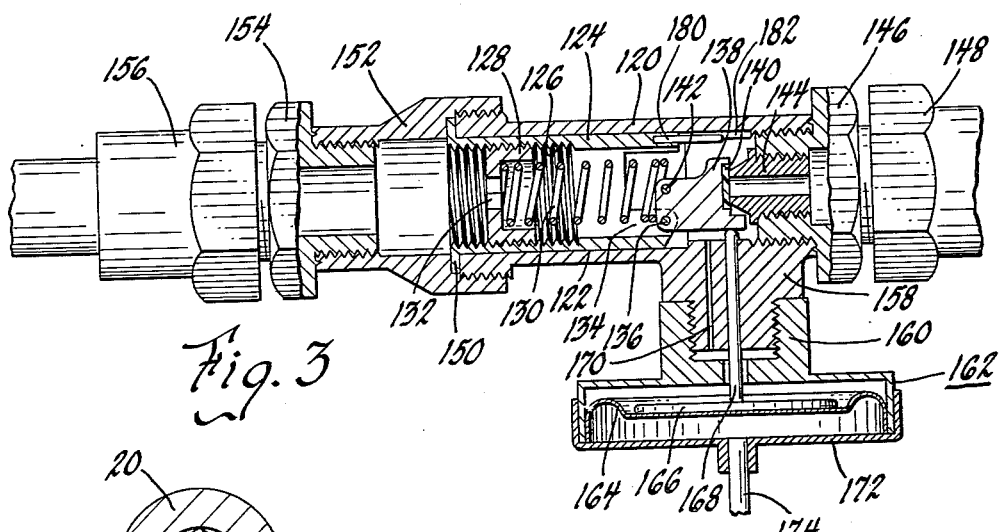
Figure 2:
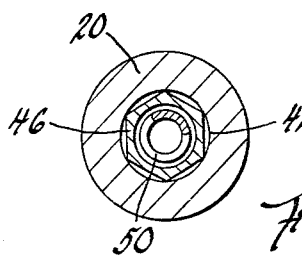

In the drawings:
FIGURE 1 is a longitudinal sectional view of one form of thermostatic expansion valve embodying my invention together with a diagrammatic representation of the remainder of a refrigerating system;
FIGURE 2 is a transverse sectional view through the valve taken along the line 2—2 of FIGURE 1; and
FIGURE 3 is a longitudinal sectional view generally similar to FIGURE 1 through a second form of valve embodying my invention.

Referring now to the drawing and more particularly to FIGURE 1, there is shown a valve body 20 which may be of hexagonal brass bar stock. This bar stock can be readily machined on an automatic screw machine with the ends 22 and 24 being square and internally threaded as designated by the reference characters 26 and 28 to receive the threaded flare nipples or unions 30 and 32 for a flare connection with the tubing of the evaporator 34 and the condenser 36. The connections between the fittings 30 and 32 and the tubing of the evaporator 34 and the condenser 36 are made through the flare nuts 38 and 40. Between the internally threaded portion 26 and 28 is a plain cylindrical bore or passage 42. All of these portions and parts are coaxially aligned with each other and with the valve body 20 so that they all can be readily made on an automatic screw machine and readily assembled together in alignment.

The plain bore 42 contains a valve member 44 provided with a hexagonal spring retaining portion 46 at one end having an internal cylindrical bore forming a recess 48 for receiving one end of the compression type closing coil spring 50. The opposite end of the spring 50 is received by the spring retainer 52 threaded into the threaded portion 26 which also receives the adjacent end of the threaded nipple or union 30. The removal of the threaded nipple or union 30 provides access to the spring retainer 52 containing a hexagonal aperture 53 receiving an Allen wrench to adjust the tension of the spring 50 which determines the evaporating pressure within the evaporator 34. The nipple or union 30 may have an annular ridge 54 contacting the adjacent end of the valve body 20 to provide a gas-tight seal.

The valve member 44 includes a yoke portion 56 which connects the spring retainer 46 with the valve head 58. The face of the valve head 58 contains a small disk 60 of a suitable seat material such as polytetrafluoroethylene or chloroprene synthetic rubber. This disk 60 is normally adapted to rest upon the valve seat number 62 which is threaded into the inner end of the nipple or union 32. This nipple or union 32 also has an annular raised portion 64 adapted to make a gas-tight sealing contact with the adjacent end of the valve body 20. The valve seat member 62 may be made of stainless steel and has a portion threaded into the nipple 32 and a head portion which abuts the inner end of the nipple 32 and has an annular valve seat area of smaller diameter coaxial with the internal bore 66.

The side of the valve body 20 is provided with a threaded aperture 68 which receives the diaphragm assembly 70. The diaphragm assembly 70 includes an externally threaded portion 72 threaded into the aperture 68 and provided with a portion extending into the bore 42 which pivotally supports the bell crank lever 74 having one end bearing upon the spring retainer portion 46 of the valve member 44. The diaphragm assembly 70 includes a flexible diaphragm 76 mounted within a cup-shaped member 78 which is connected to or integral with the threaded plug portion 72. The diaphragm 76 bears against the follower 80 having a pin portion 82 extending through the plug portion 72 into engagement with the transverse arm of the bell crank lever 74. A space is provided between the diaphragm 76 and the plane wall of the cup-shaped member 78 to allow movement of the follower 80 and to provide a chamber connected through the passage 84 in the plug portion 72 with the interior of the bore 42 so that this face of the diaphragm 76 is subjected to the pressure existing in the evaporator 34.

The opposite face of the diaphragm 76 is enclosed by a cap member 86 which is sealed to the cup-shaped member 78 by solder or other suitable means. The edges of the diaphragm 76 are also soldered or otherwise bonded to the peripheral portions of the cup-shaped member 78. The sealed chamber formed between the diaphragm 76 and the cap member 86 is connected by a capillary tube 88 extending through the wall of the cap member 86 to a thermostat bulb 90 which is ordinarily clamped to an outlet portion of the evaporator 34. This thermostat bulb 90 may be charged with a suitable volatile liquid or vapor such as the refrigerant liquid or vapor used in the refrigerating system. Also if desired, the thermostat bulb may be filled with an adsorbent such as activated charcoal and the diaphragm system charged with a suitable gas such as carbon dioxide which is absorbed and evolved from activated charcoal in accordance with changes in the temperature of the bulb 90 to exert varying pressures upon the diaphragm 76 corresponding to the variations in temperature of the bulb 90 and the adjacent portion of the evaporator 34.

The system operates in the conventional manner with the sealed motor compressor unit 92 pumping evaporated refrigerant from the evaporator 34 through the suction conduit 94 and discharging this compressed refrigerant through a discharge conduit 96 connecting with the condenser 36. The valve member 44 is moved away from the valve seat member 62 because of the high temperature of the bulb 90 and the correspondingly high pressure upon the diaphragm 76 upon the face exposed to the sealed chamber. As long as this temperature remains sufficiently high or the pressure within the evaporator 34 is sufficiently low or the combination of these two factors, the follower 80 and the pin 82 will be held upwardly to hold the bell crank lever 74 in a counterclockwise position and consequently to move and hold the valve member 44 to the left against the force of the spring 50, thereby holding the disk 60 away from the valve seat to allow refrigerant to flow from the condenser through the valve body 20 to the evaporator 34. The valve 44 restricts the flow of refrigerant so that the pressure rises within the condenser 36 sufficiently high that condensation of the refrigerant occurs so that the refrigerant is liquefied in the condenser prior to its flow into the interior of the valve body 20. A fall in the temperature of the bulb 90 will lower the pressure beneath the diaphragm 76, lowering the diaphragm 76, the follower 80 and the pin 72 allowing the bell crank lever 74 to pivot clockwise to permit the valve 44 to move toward the seat member 62 under the force of the closing spring 50 to restrict the flow of refrigerant.

In FIGURE 3 a slightly different form of valve incorporating the same general principle is disclosed. In this form the valve body 120 has a plain internal bore 122 receiving a cylindrical flared end member 124 having an internally threaded end 126 containing a spring retainer 128 threaded therein and having a recess for retaining one end of the compression type coil spring 130. The spring retainer 128 includes a hexagonal aperture 132 for an Allen type wrench or other means of making its adjustment. The member 124 also includes two projecting portions 134 supporting a pivot pin 136 which pivotally supports between the projections 134 the bell crank lever 138 having a valve head portion receiving the disc 140 of polytetrafluoroethylene or a suitable synthetic rubber. The bell crank lever 138 also includes a transverse pin 142 serving to retain the adjacent end of the spring 130 so that the spring 130 exerts a clockwise force upon the bell crank lever 138 to hold it in engagement with the adjacent end of the valve seat member 144.

This valve seat member 144 is substantially similar to the valve seat member 62 and is threaded into the nipple or union 146 providing a flare connection through the gland nut 148 with the tubing connecting with the outlet of the condenser.

The member 124 is provided with a flange 150 at its left end which is clamped against the adjacent end of the valve body 120 by the gland nut 152 which is threaded onto the adjacent end of the valve body 120. The gland nut 152 connects to a flared threaded nipple or union 154 which may be provided with gland nut 156 for connection with the inlet of the refrigerant evaporator.

The valve body 120 is provided with a boss 158 on one side which is externally threaded to receive the internally threaded portion 160 of the cup-shaped member 162 which receives the diaphragm 164, the diaphragm follower 166 and the pin 168 extending through a passage in the boss 158 into contact with the adjacent transverse face of the bell crank lever 138. The boss 158 has a passage 170 extending from the interior of the valve body 120 to the cup-shaped member 162 provided with an opening surrounding the pin 168 to provide communication with the chamber in between the diaphragm 164 and the cup-member 162 to that this face of the diaphragm is responsive to the pressure within the valve body 120 which substantially corresponds to the pressure within the evaporator. The opposite face of the diaphragm 164 is enclosed by the cap member 172 providing a chamber between it and the adjacent face of the diaphragm which communicates through the capillary tube 174 with the thermostat bulb 90 for providing a pressure within the chamber corresponding to the temperature of the bulb 90 and the adjacent portion of the evaporator 34. The periphery of the diaphragm 164 is soldered or otherwise sealed to the cup member 162 and the cap member 172 is soldered or otherwise sealed to the cup member 162.

To insure that the adjacent face of the bell crank lever 138 is always perpendicular to the axis of the pin 168, the inner cylindrical member 124 is provided with an orienting pin 180 in the form of a projection engaging an orienting groove 182 in the threaded end portion of the valve body 120. In this second form, the upward movement of the diaphragm 164, the follower 166 and the pin 168 pivot the bell crank lever 138 in a counterclockwise direction about its pivot pin 136 to move the disc 140 away from the valve seat member 144 against the force of the closing spring 130 pressing upon the pin 142.

In both forms, the valve is made convenient for application by having the inlet and outlet connections and the refrigerant flow through the valve coaxial with the valve body and the major portion of the parts. This also makes it very easy to machine the parts upon an automatic screw machine with a minimum of different placements. The diaphragm assemblies of each valve are readily removable by virtue of their threaded connection with the valve body. They therefore can be readily removed and separately manufactured and tested. In the event of any failure, defect or leakage, they can be readily substituted without the valve being removed from the refrigerating system. This makes the valve very convenient and useful.

While the embodiments of the present invention as herein disclosed, constitute preferred forms, it is to be understood that other forms might be adopted.

What is claimed is as follows:

1. A refrigerant expansion valve including a valve body having a coaxially aligned inlet and outlet adjacent its opposite ends and a coaxial refrigerant passage between said inlet and outlet, a valve seat located in said refrigerant passage within said valve body, a removable sub-assembly located in said refrigerant passage in said valve body including a frame and a valve pivotally connected to the frame and a spring within the frame bearing against said valve for urging said valve against said valve seat, said frame being also provided with a spring support for supporting said spring, means for holding said sub-assembly in said valve body, and diaphragm means operatively connected to said valve for moving said valve away from said valve seat.

2. A refrigerant expansion valve including a valve body having a coaxially aligned inlet and outlet adjacent its opposite ends and a coaxial refrigerant passage between said inlet and outlet, a valve seat located in said refrigerant passage within said valve body, a removable subassembly located in said refrigerant passage in said valve body including a frame and a valve in the form of a bell crank lever pivotally connected to the frame and a spring mounted within the frame bearing against said valve for urging said valve against said valve seat, means for holding said frame in a predetermined position in said valve body, and diaphragm means located outside of but closely coupled to said valve body operatively connected to said bell crank lever to open said valve.

References Cited in the file of this patent

UNITED STATES PATENTS

| | | |
|---|---|---|
| 1,695,330 | Grant | Dec. 18, 1928 |
| 2,021,053 | Englebright | Nov. 12, 1935 |
| 2,208,032 | Hooper | July 16, 1940 |
| 2,511,844 | Grove | June 20, 1950 |
| 2,518,894 | Humbarger | Aug. 15, 1950 |
| 2,667,898 | Eichmann | Feb. 2, 1954 |
| 2,688,977 | Droitcour | Sept. 14, 1954 |
| 2,879,793 | Jones | Mar. 31, 1959 |